E. M. CORBETT.
Photographic Camera.
No. 28,739.
Patented June 19, 1860.
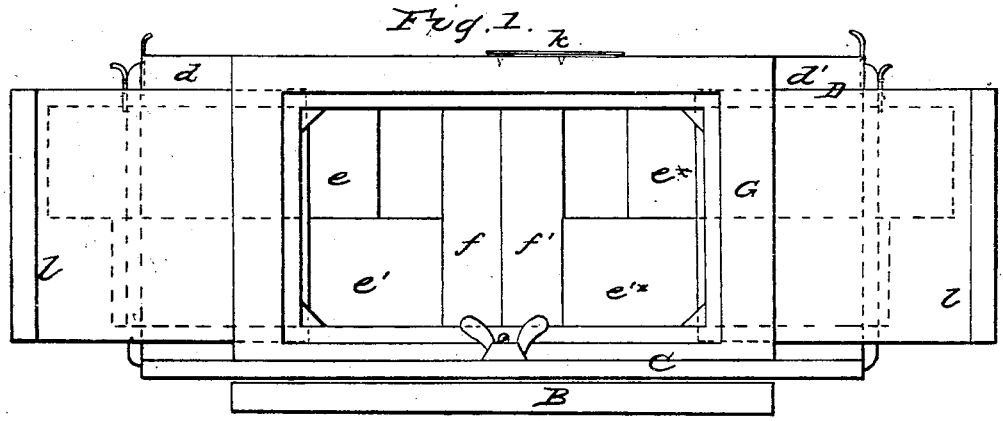
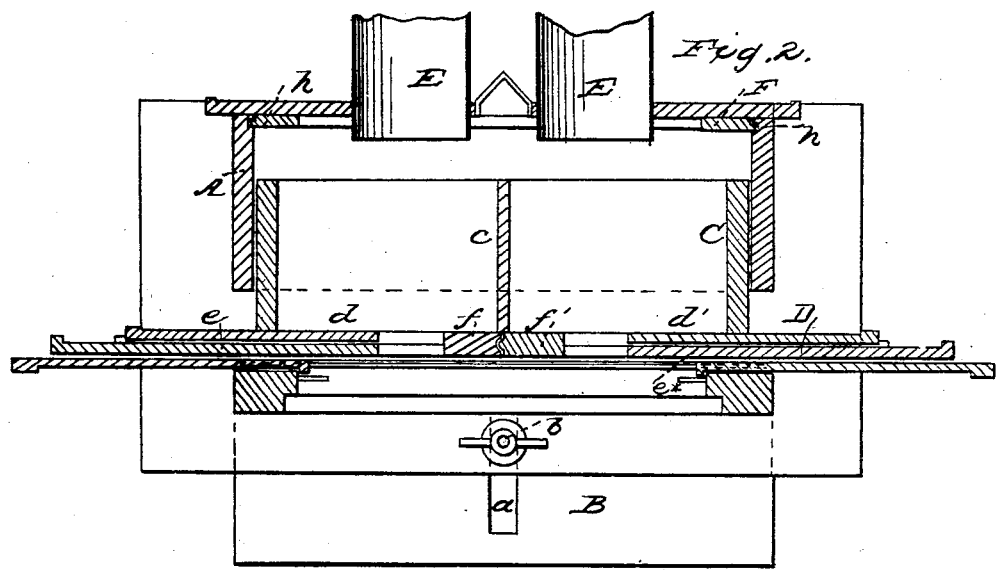
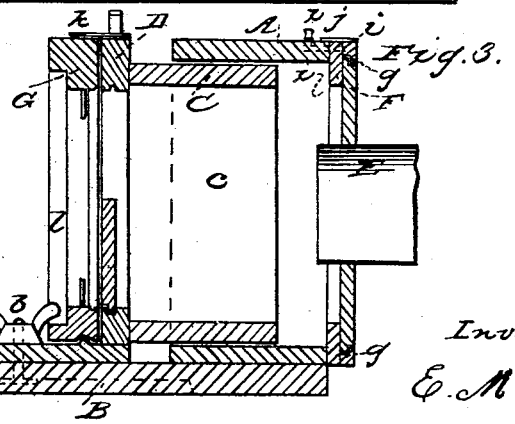

UNITED STATES PATENT OFFICE.

E. M. CORBETT, OF NEW YORK, N. Y.

PHOTOGRAPHIC CAMERA.

Specification of Letters Patent No. 28,739, dated June 19, 1860.

*To all whom it may concern:*

Be it known that I, E. M. CORBETT, of the city, county, and State of New York, have invented certain new and useful Improvements in Photographic Cameras; and I do hereby declare that the following is a full, clear, and exact description of the same, reference being had to the accompanying drawings, forming a part of this specification, in which—

Figure 1 represents an end view of my invention. Fig. 2 is a horizontal section of the same. Fig. 3 is a transverse vertical section of the same.

Similar letters of reference in the three views indicate corresponding parts.

The object of this invention is to construct the camera so that it serves for taking stereoscopic pictures and also for taking ordinary photographic pictures particularly of that kind where a great number of impressions is to be taken, and my improvements consist, 1st, in combining with the ordinary plate holder or shield a double combination slide the main slides to be opened when it is desired to take stereoscopic pictures and the additional slides to be opened when it is desired to take ordinary photographic pictures; 2d, in arranging the main slides with central rails of such a width that the centers of the openings formed on drawing out the additional slides are exactly in line with the centers of the lenses when the latter are moved apart as far as the side motion given to them will allow, in such a manner that by this arrangement of the slides the camera can be readily adjusted for taking at one and the same time two busts or two standing pictures of that size, which are put on visiting cards; 3d, in giving to the lenses a double motion one sidewise and one up and down, so that they can be readily adjusted according to the picture or pictures to be taken; 4th, in combining with the adjustable lenses two slides and an adjustable plate holder in such a manner that twelve busts or six standing pictures can be taken on the same plate without turning the plate holder simply by adjusting said slides and by shifting the plate holder from one position to the other.

To enable those skilled in the art to make and use my invention I will proceed to describe its construction and operation with reference to the drawing.

My camera consists of a box A, which is rigidly attached to the slotted bed plate B, in the ordinary manner. The slot $a$, in the bed plate forms the guide for the adjustable sliding box C, which serves to bring the plates in the proper focus and which is secured in the desired place by the screw or nut $b$. This box is divided into two equal parts by a narrow partition $c$, and its inner end is closed by a double slide D, formed of two main slides $d$, $d'$, which separate exactly in the center. By withdrawing these slides the camera is adjusted for taking stereoscopic pictures in the ordinary manner.

Each of the main slides $d$, $d'$, is provided with two additional slides $e$, $e^*$, and $e'$, $e'^*$, and these slides when pushed in as far as they will go come close up against the central rails $f$, $f'$, of the main slides, and if drawn back, the openings left between said rails and the ends of the additional slides are of such a size and the central rails of the main slides are of such a width, that the centers of said openings are precisely opposite the centers of the lenses, when the latter are drawn apart as far as they will go. When the main slides are closed up and all the additional slides are drawn out, the instrument is in the proper position to take the standing pictures of the size required for visiting cards, and if the upper pair of additional slides are drawn out and the lenses are moved down, the instrument is in the proper position to take two busts of the size required for visiting cards.

The tubes E, which contain the lenses are attached to a double slide F, each part of which has a side motion on the ways $g$, (see Fig. 3) whereby the lenses are moved further apart or brought closer together as may be desired, and the whole slide F, has a motion up and down in the ways $h$, Fig. 2 whereby the lenses can be adjusted according to the openings left by the additional slides $e$, $e^*$, $e'$, $e'^*$. A latch $i$, on the top of the box A, and catching into recesses $i'$, $i''$, and a button $j$, on the upper edge of the slide F, serve to secure said slide in the desired position. The plate holder G, has a sliding motion transversely across the box C, and it is retained in the desired position by a spring catch $k$. This catch secures the plate holder in three different positions so that six or twelve different pictures can be taken on the same plate as will be presently explained.

The plate holder is furnished with the ordinary slides $l$, to shut off the light from the plate at the desired moment.

If it is desired to take stereoscopic pictures with my instrument, the lenses are adjusted in the center of the box by pushing the slide F, down until the button $j$, strikes the top of the box A, and the distance of the lenses is regulated at pleasure by pushing them apart or closer together. The slides $d, d'$, are now drawn out and the instrument is brought in the proper position by means of the focusing glass and the pictures are taken in the ordinary manner.

If it is desired to take ordinary photographic pictures for visiting cards, the lenses are drawn apart as far as the ways $g$, will admit and for standing pictures both pairs of additional slides are drawn out, leaving two openings as before explained. After two pictures have been taken the plate holder is moved sidewise until the spring catch $k$, catches in the next succeeding hole in its top edge and two more pictures can be taken on the same plate and by bringing the plate holder in still another position, two more pictures can be taken thereby producing six standing pictures on the same plate simply by moving the plate holder from one position to the other. In the same manner 12 busts are taken on the same plate by first withdrawing the upper pair $e, e'$ of the additional slides. In this case however the lenses have to be moved up until the latch $i$, catches in the recess $i''$, (see Fig. 3) and by bringing the plate holder into the three different positions allowed to the same by the spring catch $k$, six busts are taken on the upper half of the plate. The lenses are now moved down as far as the ways $h$, will admit, the lower pair of additional slides $e^*, e'^*$, are drawn out and by bringing the plate holder again to three different positions six more busts are taken on the lower half of the plate, thereby producing twelve busts on the same plate and all in the same position. By these means I am enabled to multiply the pictures very rapidly so that I can supply the pictures required for a large number of visiting cards in a very short time.

The construction of my camera is very simple, it can easily be operated and it serves equally well for stereoscopic pictures and for the photographic pictures required for visiting cards, so that by a simple manipulation the operator is enabled to accomplish with one instrument the same work and more too, as with two instruments of the ordinary construction.

Having thus fully described my invention what I claim as new and desire to secure by Letters Patent, is:—

1. The combination with the plate holder G, of the double combination slide D, constructed and operating substantially as and for the purpose set forth.

2. Arranging the main slides $d, d'$, of the slide D, with central rails $f, f'$, substantially in the manner and for the purpose described.

3. The arrangement and combination of the double adjustable lenses E, slides $e, e^* e'$, $e'^*$, and adjustable plateholder G, constructed and operating substantially in the manner and for the purpose set forth.

E. M. CORBETT.

Witnesses:
J. W. Scott,
L. W. Bendie.